(12) United States Patent
Timperman et al.

(10) Patent No.: US 7,515,587 B2
(45) Date of Patent: Apr. 7, 2009

(54) DEVICE FOR PROCESSING DATA PACKETS WITHOUT USE OF A MICROPROCESSOR AND A MEMORY

(75) Inventors: Michael Ray Timperman, Versailles, KY (US); Jason Eric Waldeck, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1239 days.

(21) Appl. No.: 09/957,008

(22) Filed: Sep. 20, 2001

(65) Prior Publication Data

US 2003/0053452 A1   Mar. 20, 2003

(51) Int. Cl.
H04L 12/28   (2006.01)
(52) U.S. Cl. ........................... 370/392; 370/401
(58) Field of Classification Search ............... 370/389, 370/392, 401–404
See application file for complete search history.

(56) References Cited

U.S. PATENT DOCUMENTS

| | | | |
|---|---|---|---|
| 5,506,993 A | 4/1996 | Fitch et al. | |
| 5,790,786 A | 8/1998 | Wakeman et al. | |
| 5,842,224 A | 11/1998 | Fenner | |
| 5,898,687 A * | 4/1999 | Harriman et al. | 370/390 |
| 5,943,604 A | 8/1999 | Chen et al. | |
| 5,951,651 A | 9/1999 | Lakshman et al. | |
| 5,959,976 A | 9/1999 | Kuo | |
| 6,032,019 A | 2/2000 | Chen et al. | |
| 6,034,963 A * | 3/2000 | Minami et al. | 370/401 |
| 6,097,729 A | 8/2000 | Chao | |
| 6,122,281 A | 9/2000 | Donovan et al. | |
| 6,128,313 A | 10/2000 | Chapman et al. | |
| 6,154,796 A | 11/2000 | Kuo et al. | |
| 6,636,509 B1 * | 10/2003 | Hughes | 370/389 |
| 6,700,888 B1 * | 3/2004 | Jonsson et al. | 370/392 |
| 6,876,653 B2 * | 4/2005 | Ambe et al. | 370/389 |
| 2003/0007489 A1 * | 1/2003 | Krishnan et al. | 370/392 |

* cited by examiner

*Primary Examiner*—Edan Orgad
*Assistant Examiner*—Jung Park
(74) *Attorney, Agent, or Firm*—Taylor & Aust, PC

(57) ABSTRACT

A method of processing data packets includes receiving a plurality of the data packets at a selected node. Pertinent information in the data packets is extracted. The pertinent information is pertinent to the selected node. A plurality of response data packets are generated based on the pertinent information. The extracting and generating steps are performed without use of a microprocessor.

17 Claims, 5 Drawing Sheets

DEVICE FOR PROCESSING DATA PACKETS WITHOUT USE OF A MICROPROCESSOR AND A MEMORY

BACKGROUND OF THE INVENTION

1. Field of the Invention

The present invention relates to network communication, and, more particularly, to a packet processing node for network communication.

2. Description of the Related Art

In many communication systems, any transmission from one node is sent to a plurality of connected nodes. In such broadcast systems, the information may only be relevant to a single receiver, but all nodes must process the transmission to determine its intent. Data on such networks are usually broken into pieces known as packets. A packet is formed of consecutive bytes that may be marked by leading and/or trailing delimiters. Protocols by which nodes communicate usually divide a packet into the protocol-relevant information (the header) and the data relevant to the receiving node (payload).

It is known for the protocols to be "layered" so that the payload area of a lower protocol contains a packet of the next higher layer protocol. Most communication environments require that addressing information be contained at fixed locations (in the first few bytes) of the lowest layer protocol header so that hardware can help discard unwanted packets by simple filtering.

There are many examples of commercially available network devices that perform such filtering. Practically all Ethernet media access controllers (MAC's), for instance, provide for filtering based on an exact match of the first six bytes of a packet header to a programmed value (the network address). This greatly reduces the load of the general-purpose central processing unit (CPU). However, many network frames that are addressed to the node either distinctly or by a shared address are still not relevant to a particular node. The receiving equipment may be required to look at an entire packet to determine its relevance. Additional cost is inherent in networked systems because memory is required to store the entire packet while the processing elements perform the analysis.

Most of the existing patents relating to packet filtering are a result of the very competitive commercial network switch and router market. Routers must sort received frames into subsets based on different byte fields within a packet. To achieve high throughput, specialized hardware can be used to perform this sorting. In all known cases, an assumption is made that a CPU is present and only assists the microprocessor in performing its task. A problem is that a microprocessor adds significant cost to the product.

What is needed in the art is a device for network communication that does not require a microprocessor.

SUMMARY OF THE INVENTION

The present invention provides a device for network communication using specialized hardware that eliminates the need for a microprocessor in the system. The device processes information in a packetized communication system. The result is a minimal-cost packet-processing node.

A hardware apparatus extracts only pertinent information from received packets and can generate response packets based on the same information. This processing is done in real time and without the use of an additional data processing system that might include a microprocessor or storage memory.

The invention comprises, in one form thereof, a method of processing data packets. A plurality of the data packets are received at a selected node. Pertinent information in the data packets is extracted. The pertinent information is pertinent to the selected node. A plurality of response data packets are generated based on the pertinent information. The extracting and generating steps are performed without use of a microprocessor.

The invention comprises, in another form thereof, a data packet communication system including a peripheral device and a filter device connected to the peripheral device. The filter device receives a plurality of data packets and identifies pertinent information in the data packets. The pertinent information is pertinent to the peripheral device.

An advantage of the present invention is that network packet processing is performed without the need for a microprocessor.

Another advantage is that the packet filter hardware not only identifies packets relevant to the receiving node, but also extracts any pertinent information contained in the data stream.

Yet another advantage is that signals are created by the filter hardware to indicate that a response packet should be generated using the extracted information.

A further advantage is that the packet filter hardware can be replicated and used in parallel to provide different protocols within the same network node.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
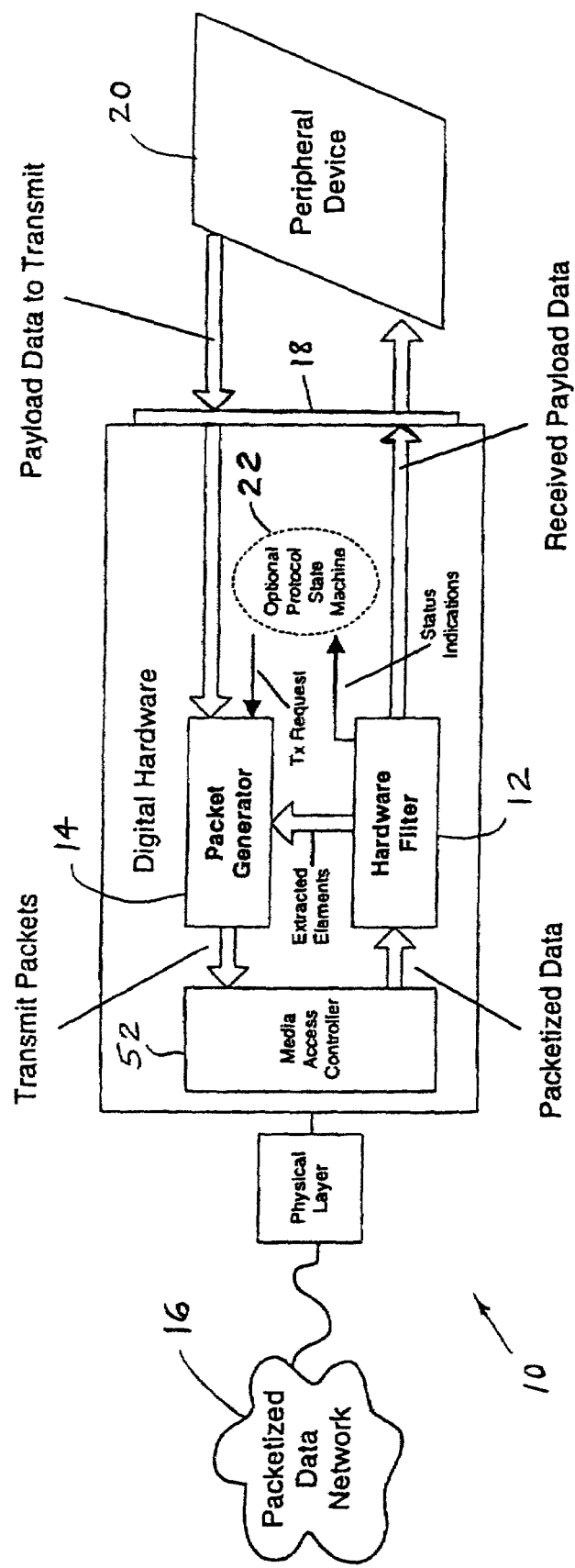
FIG. 1 is a block diagram of one embodiment of a packet communication device of the present invention connected to a peripheral device and a packetized data network.

Referring now to the drawings and particularly to FIG. 1, there is shown one embodiment of a packet communication device 10 of the present invention. Device 10 includes neither a microprocessor nor storage memory. That is, device 10 is microprocessorless and memoryless. Device 10 includes a hardware filter 12 and a packet generator 14 connected to a packet data network 16. Hardware filter 12 and packet generator 14 are also connected via an interface 18 to a payload data consumer in the form of a peripheral device 20. An optional protocol state machine 22 may be necessary to convert filter indications into transmit requests to packet generator 14. Network 16 may be any of the common serial network architectures (such as Ethernet or Token Ring) or generally any packetized data stream. Peripheral device 20 can be any data consumer system that utilizes information, e.g., a computer, printer, set-top box, or other peripheral. Interface 18 may be in the form of a first in first out (FIFO) memory or data buffer.

Figure 2:
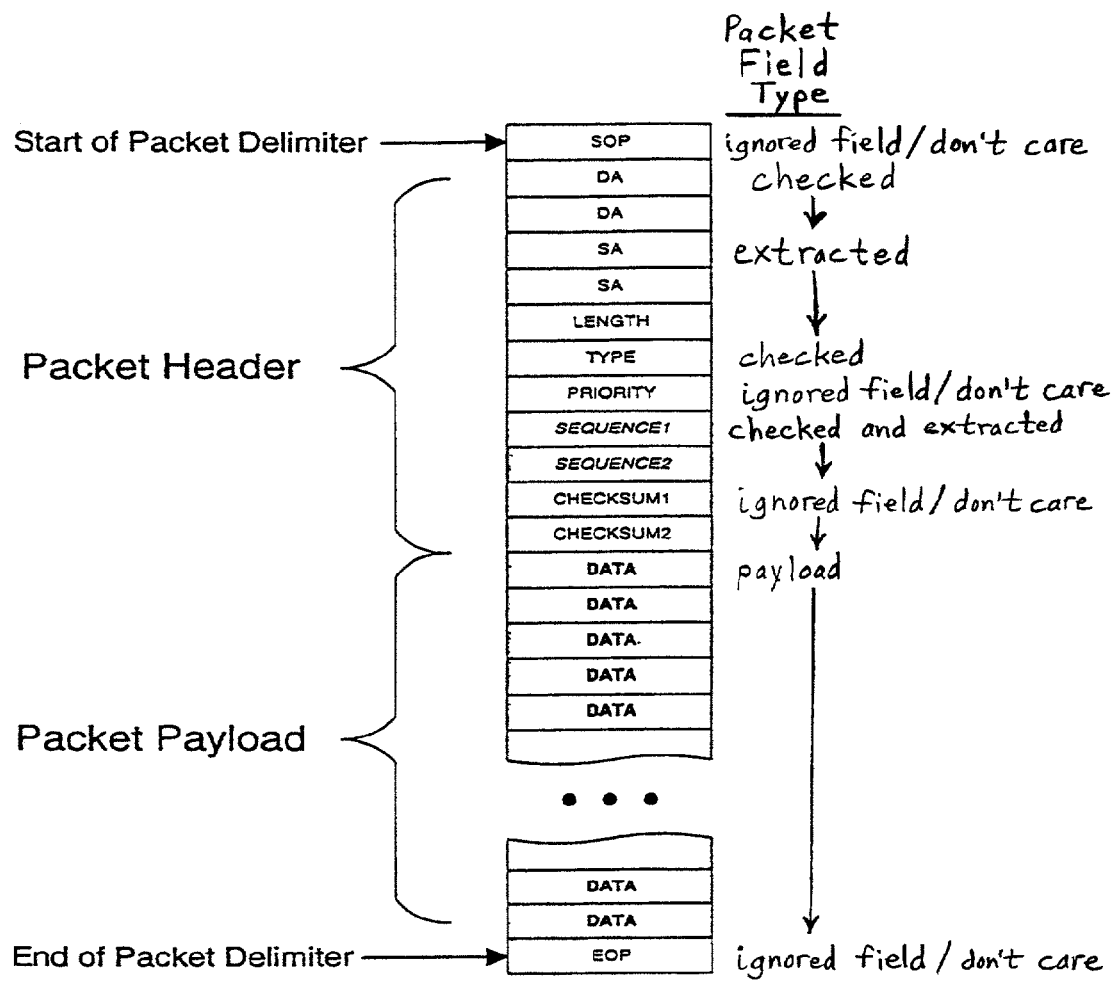
FIG. 2 is a block diagram of one embodiment of a data packet processed by the packet communication device of FIG. 1.

The format of one embodiment of a network data packet processed by device 10 is shown in FIG. 2. Only fields of interest, i.e., pertinent, to the receiving node, i.e., peripheral device 20, are important and are therefore processed. The pertinent information is the minimum amount of information needed to correctly implement the protocol. That is, the pertinent information is what is mandatory for a minimal implementation of the protocol. Bytes of interest, i.e., pertinent data, include the payload data as well as header data that might identify the packet type, the intended receiver, sequencing information, and so forth. Such pertinent fields include a sequence number field, which indicates the order the data is in, a destination address (DA) and a source address (SA). Thus, information pertinent to the receiving node includes selected bytes within the data packets.

Other packet bytes not of interest to peripheral device 20, such as diagnostic information, are treated as "don't care" information and are ignored. Such non-pertinent fields include a checksum field, a priority field, start-of-packet delimiter (SOP) and end-of-packet delimiter (EOP).

Figure 3:
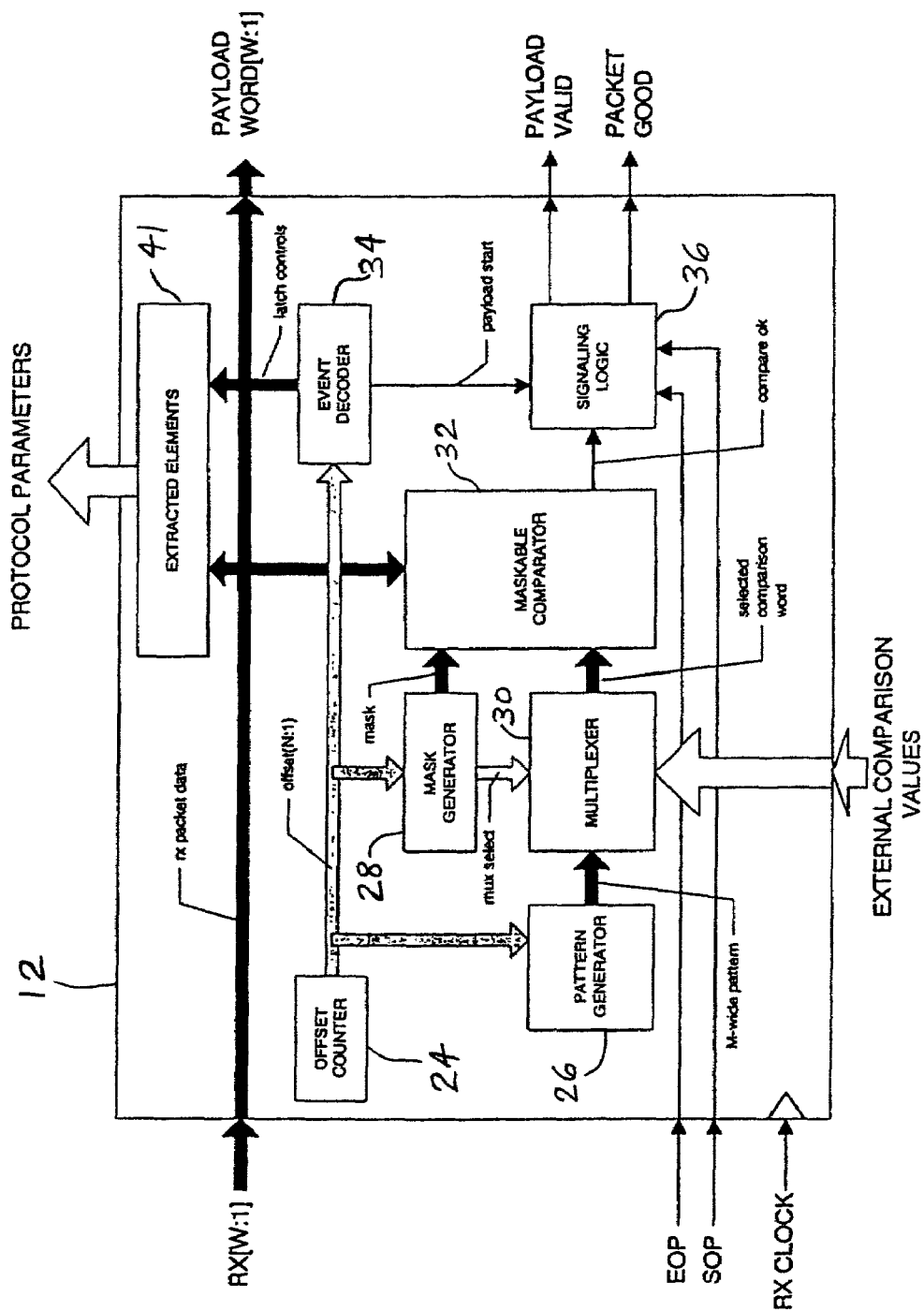
FIG. 3 is a block diagram of the hardware filter of FIG. 1.

Hardware filter 12 receives packetized data from network 16 and includes an offset counter 24 (FIG. 3), pattern generator 26, mask generator 28, multiplexer 30, maskable comparator 32, event decoder 34 and signaling logic 36. All of these blocks are easily constructed by someone skilled in the art. The incoming packet data stream is assumed to be a stream of words (of fixed bit-width W) with start-of-packet (SOP) and end-of-packet (EOP) indicators that are synchronous to a common receive clock. This is a common interface for media access control (MAC) hardware. The outputs of hardware filter 12 include an extracted payload data stream (payload word), protocol parameters, and indicators of a successfully accepted packet.

Offset counter 24 includes an N-bit counter that tracks the number of words from the start of a packet. Counter 24 is wide enough to accommodate a maximum-length packet for the particular network medium. Offset counter 24 is cleared upon receiving the SOP indication and increments by one with each packet word received.

Packet generator 26 is a special case of an N to M decoder. Given an input value of width N, pattern generator 26 outputs a predetermined corresponding word of width M. The decoder is designed so that, given the input packet offset, the output of the decoder is the corresponding word required for packet acceptance.

Mask generator 28 is similar to pattern generator 26. Mask generator 28 decodes offset counter 24 and produces a bitmask. The mask indicates which bits within the word are compared. An additional set of outputs is routed to multiplexer 30. These outputs determine whether multiplexer 30 should pass the output of pattern generator 26 or one of the external comparison values to comparator 32. The external comparison values are specific to the receiving node (peripheral device 20), such as its network address, or are states within the protocol. For protocols where it is only necessary to examine entire words, only the multiplexer control outputs are necessary.

Maskable comparator 32 indicates whether the bits in the received packet work unmasked by mask generator 28 are equal to the corresponding bits in the output of multiplexer 30. A logical "0" on the output of comparator 32 indicates that all unmasked bits match. If the word is a don't care (all bits masked), the output is also a "0".

Event decoder 34 indicates when header information needs to be stored into memory elements (flip-flops). This allows protocol state machine 22 to use the information when updating its state or transmitting a response. Event decoder 34 is also used to generate a Payload Start (PS) signal to indicate where in the packet payload data should be extracted.

Figure 4:
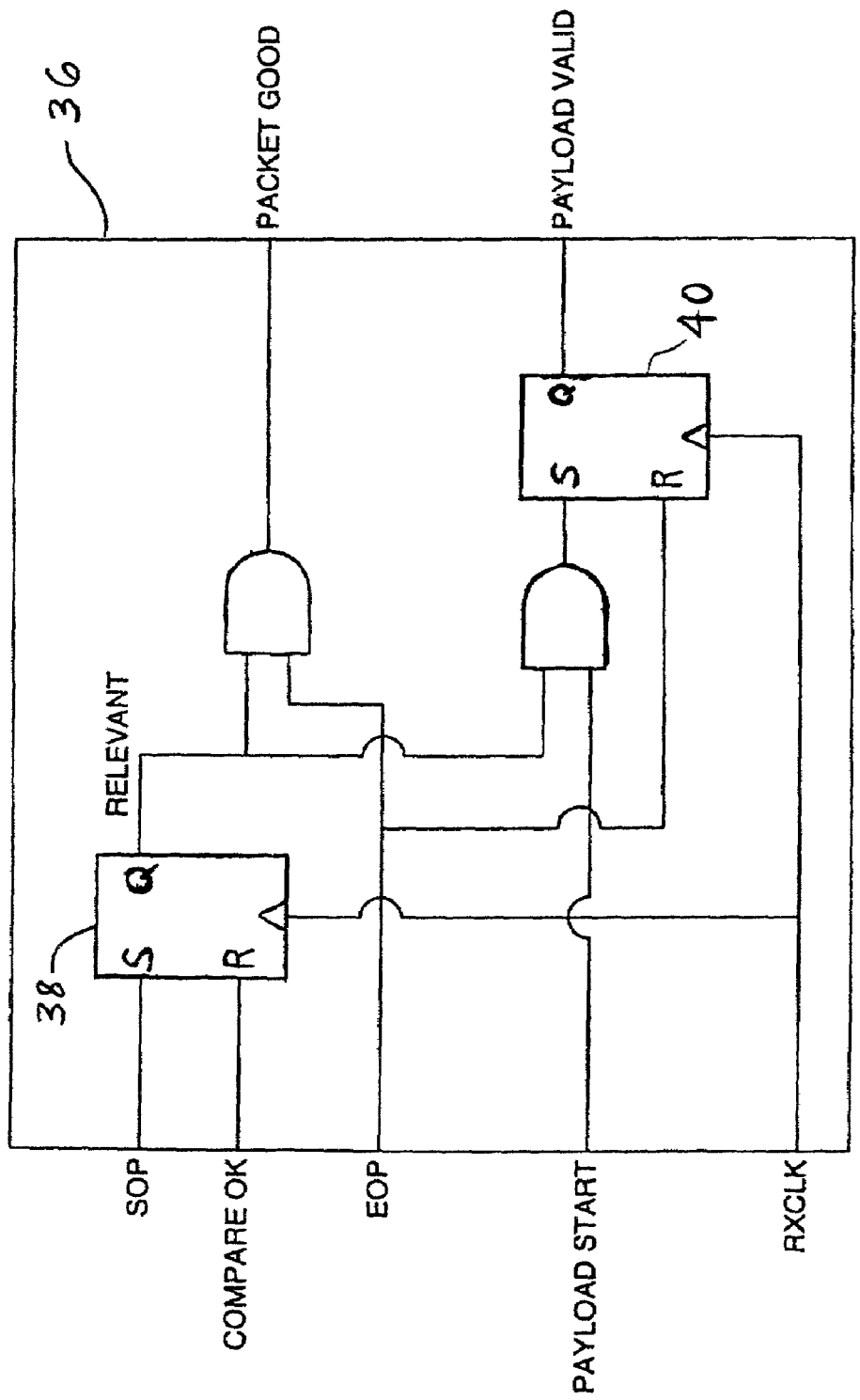
FIG. 4 is a schematic diagram of the signaling logic of FIG. 3.

Signaling logic 36 generates indicators to outside entities. A signal, RELEVANT (FIG. 4), is generated with an R-S flip-flop 38. The start-of-packet (SOP) signal is connected to the "S" input of flip-flop 38, with the "R" input connected to the output of maskable comparator 32. Thus, the RELEVANT signal goes high at the start of a packet and remains high until comparator 32 finds a problem with the packet. The RELEVANT signal is logically AND'ed with the end-of-packet (EOP) signal to create a PACKET GOOD signal for use outside filter 12. Another R-S flip-flop 40 generates a PAYLOAD VALID signal. The PAYLOAD START signal is AND'ed with the RELEVANT signal, and the result is connected to the "S" input of flip-flop 40. The end-of-packet (EOP) signal is connected to the "R" input of flip-flop 40. This creates a signal that is active for the entire payload of packets whose header matches the acceptable criteria.

In operation, when the start-of-packet (SOP) indicator is given, offset counter 24 is cleared and the RELEVANT signal is set active. Packet data starts entering filter 12, with counter 24 incrementing with each word. At each word, mask generator 28 determines whether any part of the word is necessary for comparison. Mask generator 28 also determines which value should be used for the comparison, i.e., the output of pattern generator 26 or one of the external comparison values. The output of pattern generator 26 is a "don't care" condition whenever a comparison is not performed. Multiplexer 30 steers the appropriate compare word to comparator 32, and comparator 32 indicates if a necessary match is missing. If it is so indicated, the RELEVANT signal drops inactive and processing is ignored for the remainder of the packet, although the processing does continue. If the header is successfully processed, i.e., the PAYLOAD START signal is generated, then the PAYLOAD VALID signal activates and the packet payload data is passed to peripheral device 20 for consumption. This continues until the end-of-packet (EOP) signal is indicated, which causes the PAYLOAD VALID signal to deactivate and the PACKET GOOD signal to be pulsed.

Meanwhile, event decoder 34 extracts header data, e.g., extracted elements 41, by activating the enable inputs of storage flip-flops attached to the data stream. When the PACKET GOOD signal is pulsed, protocol state machine 22 can determine if a response is necessary. If such a response is called for, the extracted header information is then available to packet generator 14 as header input data for transmission.

Other embodiments of the hardware filter might be needed for difficult protocols. The comparator could include more arithmetic logic unit (ALU)-like functions (less than, greater than, etc.) than merely the "equals" operation. Pattern generator 26, mask generator 28 and event decoder 34 could be replicated and connected in parallel to identify various types of packets.

Multiple hardware filters 12 could be used in parallel to detect different protocols, or might be cascaded serially to allow for the stripping of the individual protocol layers, as needed.

Figure 5:
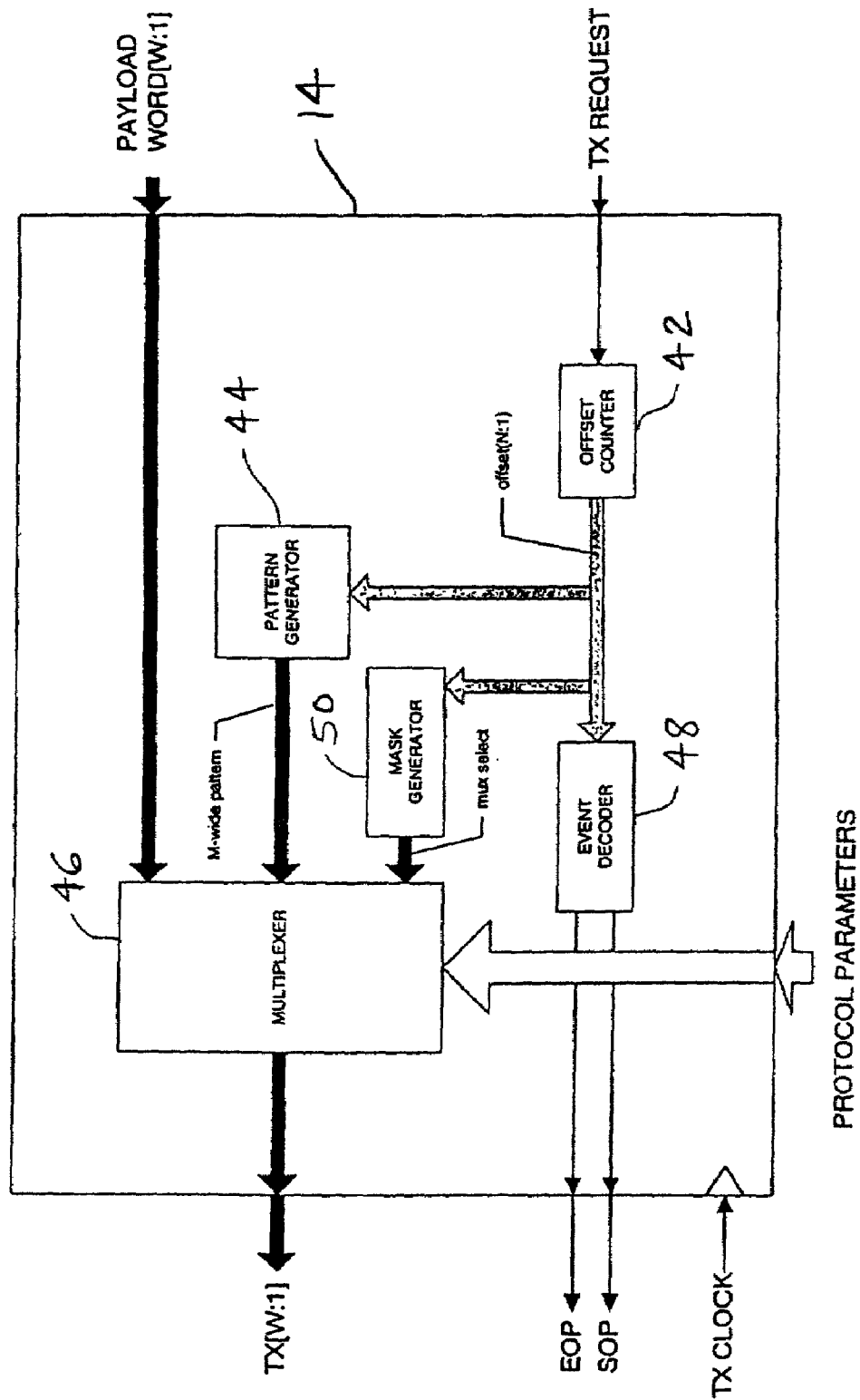
FIG. 5 is a block diagram of the packet generator of FIG. 1.

Packet generator 14 transmits packets to network 16. As shown in FIG. 5, packet generator 14 includes the same building blocks as those found in hardware filter 12. Packet generator 14 includes an offset counter 42, a pattern generator 44, a multiplexer 46, an event decoder 48, and a mask generator 50.

Offset counter 42, pattern generator 44, event decoder 48, and multiplexer 46 perform the same functions as offset counter 24, pattern generator 26, event decoder 34, and multiplexer 30, respectively. Pattern generator 44 may or may not have the exact same patterns as pattern generator 26. Pattern generator 44 is protocol-dependent.

Mask generator 50 is only used to create the multiplexer steering controls. The masks need not be generated since no comparisons are performed on the transmit side of device 10, i.e., within packet generator 14

Packet generator 14 operates exactly as the logic used to create the comparison word in filter hardware 12. When a packet is to be sent, offset counter 42 is cleared and pattern generator 44, mask generator 50 and event decoder 48 decode the offset into a transmission word. This word is sent to media access controller 52 for transmission. When media access controller 52 requires the next word, offset counter 42 is incremented and the process continues until all words of a packet have been sent. Event decoder 48 creates the necessary framing signals SOP and EOP.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of processing data packets, comprising:
   receiving at a device a plurality of the data packets at a selected node;
   extracting pertinent information from the data packets, the pertinent information being pertinent to said selected node, comprising:
      generating a decoded signal corresponding to input packet offset of a received data packet word;
      selecting between the decoded signal and data pertaining to the device and generating a selection output signal based upon the selection;
      comparing at least a portion of the received packet word to the selection output signal; and
      indicating to the device that payload data corresponding to the received data packets is valid based upon the comparison;
   generating a plurality of response data packets based on the pertinent information, wherein said extracting and generating steps are performed without use of a microprocessor; and
   transmitting a signal indicating that the response data packets should be sent.

2. The method of claim 1, wherein the extracting further comprises indicating to the device that the payload data corresponding to the received data packets is not valid upon the determination during the comparing that the at least one portion of the received packet word does not match the selection output signal.

3. The method of claim 1, wherein the extracting comprising storing a source address of the received data packets, and wherein the response data packets includes the stored source address.

4. The method of claim 1, wherein the generating comprises:
   providing a second decoded signal corresponding to outgoing packet offset, and selecting one of the second decoded signal, information pertaining to the peripheral device and outgoing payload data to form at least part of the response data packets.

5. A data packet communication system, comprising:
   a peripheral device;
   a filter device connected to said peripheral device, said filter device being configured to receive a plurality of data packets and identify pertinent information in said data packets, said pertinent information being pertinent to said peripheral device, said filter comprising a pattern generator providing a decoded output signal corresponding to input packet offset of a received data packet word, a selector selecting one of the decoded output signal and data pertaining to the peripheral device, and circuitry comparing at least a portion of the received data packet word to an output of the selector and generating at least one signal indicating acceptance of a successfully received data packet based upon the comparison;
   a packet generator connected to said peripheral device and said filter device, said packet generator being configured to generate a plurality of response data packets based on said pertinent information,
   wherein said packet generator is configured to transmit said response data packets; and
   wherein said filter device is configured to transmit a signal indicating that said response data packets should be generated.

6. The system of claim 5, wherein said packet generator is configured to transmit said response data packets to a packetized data network.

7. The system of claim 6, further comprising a protocol state machine configured for receiving the signal from said filter device and issuing a request to said packet generator to transmit said response data packets.

8. The system of claim 5, wherein the circuitry further generates a signal indicating that payload data corresponding to the received data packets is not valid based upon the comparison.

9. The system of claim 5, farther comprising a mask generator providing a bit-mask corresponding to the input packet offset, the bit-mask being applied to the received data packet for comparing by the circuitry.

10. The system of claim 5, wherein the packet generator comprises:
    a second pattern generator providing a decoded signal corresponding to outgoing packet offset, and a second selector selecting one of the decoded signal, information pertaining to the peripheral device and outgoing payload data to form at least a portion of the response data packets.

11. A data packet communication device, comprising:
    a filter device configured to receive a plurality of data packets and identify pertinent information in said data packets;
    a packet generator configured to generate a plurality of response data packets based on said pertinent information, comprising a pattern generator providing a first decoded signal corresponding to outgoing packet offset and a selector selecting one of the first decoded signal, information pertaining to the communication device and outgoing payload data;

wherein said filter device is configured to transmit a signal indicating that said response data packets should be generated and said filter device compromises a second pattern generator providing a second decoded signal corresponding to input packet offset of a received data packet word, a second selector selecting one of the second decoded signal and data pertaining to the peripheral device, and circuitry comparing at least a portion of the received data packet word to an output of the selector and generating at least one signal indicating acceptance of a successfully received data packet based upon the comparison.

12. The device of claim 11, further comprising a protocol state machine configured for receiving the signal from said filter device and issuing a request to said packet generator to transmit said response data packets.

13. The device of claim 11, wherein the information pertaining to the communications device comprises protocol information corresponding to the protocol with which the device received the plurality of data packets.

14. A method of processing data packets, comprising:
receiving at a device a plurality of the data packets at a selected node;
extracting pertinent information from the data packets, the pertinent information being pertinent to said selected node, comprising:
generating a decoded signal corresponding to input packet offset of a received data packet word;
selecting between the decoded signal and data pertaining to the device and generating a selection output signal based upon the selection;
comparing at least a portion of the received packet word to the selection output signal; and
indicating to the device that payload data corresponding to the received data packets is valid based upon the comparison;
generating a plurality of response data packets based on the pertinent information; and
transmitting a signal indicating that the response data packets should be sent.

15. The method of claim 14, wherein the extracting further comprises indicating to the device that the payload data corresponding to the received data packets is not valid upon the determination during the comparing that the at least one portion of the received packet word does not match the selection output signal.

16. The method of claim 14, wherein the extracting comprising storing a source address of the received data packets, and wherein the response data packets includes the stored source address.

17. The method of claim 14, wherein the generating comprises:
providing a second decoded signal corresponding to outgoing packet offset, and selecting one of the second decoded signal, information pertaining to the peripheral device and outgoing payload data to form at least part of the response data packets.

* * * * *